(12) United States Patent  
Courcambeck et al.

(10) Patent No.: US 8,996,874 B2
(45) Date of Patent: Mar. 31, 2015

(54) PROTECTION OF A PROGRAM WAITING TO BE EXECUTED IN A MEMORY USED BY A MICROPROCESSOR

(75) Inventors: Stéphan Courcambeck, Saint Cyr sur Mer (FR); Claude Anguille, Banc Bel Air (FR)

(73) Assignee: STMicroelectronics SA, Montrouge (FR)

( * ) Notice: Subject to any disclaimer, the term of this patent is extended or adjusted under 35 U.S.C. 154(b) by 1687 days.

(21) Appl. No.: 10/817,325

(22) Filed: Apr. 1, 2004

(65) Prior Publication Data

US 2004/0255124 A1    Dec. 16, 2004

(30) Foreign Application Priority Data

Apr. 3, 2003    (FR) ...................................... 03 04149

(51) Int. Cl.
  *H04L 9/00*    (2006.01)
  *G06F 12/14*    (2006.01)
  *G06F 21/53*    (2013.01)
  *G06F 21/62*    (2013.01)

(52) U.S. Cl.
  CPC ............ *G06F 12/1475* (2013.01); *G06F 21/53* (2013.01); *G06F 21/6218* (2013.01)
  USPC ............................ 713/176; 717/108; 718/100

(58) Field of Classification Search
  CPC ... G06F 21/6218; G06F 21/78; G06F 12/145; G06F 21/53
  USPC ........................................................ 713/176
  See application file for complete search history.

(56) References Cited

U.S. PATENT DOCUMENTS

| | | | | |
|---|---|---|---|---|
| 5,940,513 A * | 8/1999 | Aucsmith et al. | ............. | 713/187 |
| 6,868,471 B1 * | 3/2005 | Kota | ................. | 711/2 |
| 7,082,615 B1 * | 7/2006 | Ellison et al. | ................... | 726/26 |
| 7,346,780 B2 * | 3/2008 | Sinha et al. | .................... | 713/187 |
| 7,496,757 B2 * | 2/2009 | Abbott et al. | ................. | 713/176 |
| 2003/0140236 A1 * | 7/2003 | Mueller | ........................ | 713/187 |
| 2003/0217277 A1 * | 11/2003 | Narayanan | .................... | 713/187 |
| 2005/0132375 A1 * | 6/2005 | Douceur et al. | ............. | 718/100 |
| 2007/0101147 A1 * | 5/2007 | Brunk et al. | ................. | 713/176 |
| 2007/0288922 A1 * | 12/2007 | Sueyoshi et al. | ............. | 718/100 |

OTHER PUBLICATIONS

G. Edward Suh, et al; "Hardware Mechanisms for Memory Integrity Checking"; Technical Report MIT-LCS-TR-872; pp. 1-18; Nov. 18, 2002.
Tanguy Gilmont et al.; "Enhancing Security in the Memory Management Unit"; 1999 IEEE; pp. 449-456.
Jerry Huck et al.; "Architectural Support for Translation Table Management in Large Address Space Machines"; 1993 IEEE; pp. 39-50.
French Search Report; Dec. 18, 2003.

* cited by examiner

*Primary Examiner* — Fikremariam A Yalew
(74) *Attorney, Agent, or Firm* — Seed IP Law Group PLLC

(57) ABSTRACT

A method for authorizing an access to a table of address correspondence between a multitask CPU and at least one memory containing several programs, consisting of calculating, on each task change of the CPU, a signature of at least part of the program instruction lines, and checking the conformity of this signature with a signature recorded upon previous execution of the involved program.

22 Claims, 2 Drawing Sheets

PROTECTION OF A PROGRAM WAITING TO BE EXECUTED IN A MEMORY USED BY A MICROPROCESSOR

PRIORITY CLAIM

This application claims priority from French patent application No. 03/04149 filed on Apr. 3, 2003, which is incorporated herein by reference.

BACKGROUND OF THE INVENTION

1. Field of the Invention

The present invention relates to the field of micro-processors and more specifically to multitask circuits capable of executing, at least from the user's viewpoint, several programs simultaneously. In practice, a single instruction of a program is processed at each time by a central processing unit (CPU) but several programs or program sections are stored in a RAM by the CPU which transfers lines of the program to be executed to a cache memory assigned thereto.

2. Discussion of the Related Art

FIG. 1 is a schematic block diagram of an example of a simplified architecture of the type to which the present invention applies. A CPU 1 equipped with a cache memory 2 (CACHE) is connected to one or several buses 3 of communication (data, addresses, control signals) with peripheral elements. Among the peripheral elements, a RAM 4 intended to contain the data (operands) of the programs being processed as well as the code lines of these programs (at least by blocks) is connected to bus 3. In practice, the programs contained in memory 4 generally originate from a mass storage 5 (MMEN), for example, a hard disk. This mass storage contains the programs likely to be executed by the CPU as well as the data saved when these programs are not being executed. Of course, several mass storages (CDROM, floppy disk, etc.) may be connected to bus 3.

To execute several different applications or programs temporarily stored in memory 4, CPU 1 must have a table of correspondence between so-called virtual addresses of the program, which are independent from its storage location, and so-called physical addresses corresponding to the physical addresses in the memory, for example memory 4, where the different program lines are stored. This correspondence table is generally stored in buffers and is generally designated as a TLB (Translation Look Aside Buffer).

FIG. 2 schematically and functionally illustrates a correspondence table 10 and the exchanges between the cache memory or register containing this table and the different elements using it.

On the side of CPU 1, each time an instruction of a program stored in RAM 4 must be executed, this instruction is called by using virtual address VirtAD of this instruction corresponding to the address contained in the program. This virtual address is converted by table 10 into a physical address PhysAD where this instruction is located in RAM 4. RAM 4 then provides the corresponding instruction over the bus (3, FIG. 1) to the CPU.

If table 10 does not contain the correspondence between the two addresses, the CPU or, more specifically, a calculation program (block 11, CALC) of its exploitation system calculates a new correspondence line between the virtual address and the physical address, and writes it into correspondence table 10.

Each time an application contained in RAM 4 must be executed by the CPU, the exploitation system takes over and uses its internal structures to calculate the correspondence table for the involved program.

FIG. 3 illustrates the fact that two different applications APPL1 and APPL2 stored in RAM 4 at different physical addresses (PhysAD(k) to PhysAD(m) for the first program and PhysAD(n) to PhysAD(p) for the second program) share identical virtual addresses (VirtAD(1), VirtAD(2), VirtAD(i), etc). Each time a program comes to the foreground, that is, is executed by CPU 1 (possibly after transfer into cache memory 2), its correspondence table 10 is used to convert its virtual addresses into physical addresses in memory 4.

For security reasons in the program execution, it is important for two identical virtual addresses of two different applications not to point to the same physical address in memory 4. Indeed, this enables protecting the program code, as well as the application data, from one another. For example, if critical data (secret quantity, secret result, etc.) of a first application are located at a physical address between addresses k and m in memory 4 while they are assigned a virtual address i, absolutely no other application must be able to access the corresponding physical address by reusing virtual address i. In an architecture of the type in FIG. 2, the correspondence table must be reset each time it is switched from one application to another. This imposes recalculating the correspondence table each time an application switches to a foreground execution, that is, one of its instructions must be executed by the CPU.

An obvious disadvantage is that this takes time.

FIG. 4 schematically illustrates the architecture of a conventional solution avoiding recalculation of the correspondence table each time an application comes to the foreground. This solution uses an additional field of correspondence table 10 which contains, for each line, an identifier ASID of the application in addition to the virtual and physical addresses. This enables, in principle, avoiding association of an application with a physical address corresponding to another application.

To implement this solution, the circuit uses a register 20 (ASIDREG) containing the identifier of the current application. This register is a state register of CPU 1.

This solution has the advantage, as compared to that of FIG. 2, of not requiring resetting or emptying the correspondence table each time the foreground task is changed.

A disadvantage however remains that it is the exploitation system that assigns identifiers ASID to the different applications when an application is loaded into the RAM for execution. The area of RAM 4 assigned to a suspended (background) application accordingly becomes more vulnerable to possible attacks. Indeed, from the moment that the correspondence table is not integrally recalculated when the application comes to the foreground, it is possible to replace the RAM with an emulator, or to modify the signals on bus 3, to modify an operation code of a background application and insert a pirate instruction (of virus or "Trojan horse" type) therein. Then, when the modified application comes back to the foreground, it can then have access to the physical addresses which have remained present in the correspondence table upon former execution of the modified application (ie., before it has been modified).

This vulnerability of a background application is increased by the fact that it is not necessary to be synchronous with the CPU to modify the lines of this memory.

A similar problem is posed for mass storage 5 when the program is not integrally loaded into RAM 4 and its execution requires data line calls in mass storage 5.

SUMMARY OF THE INVENTION

An embodiment of the present invention aims at providing a method for allowing access to a correspondence table which overcomes the disadvantages of known solutions. In particular, an embodiment of the present invention aims at avoiding systematic recalculation of a correspondence table at each foreground loading of an application to be executed, without making it vulnerable when it is in the background in a RAM.

An embodiment of the present invention also aims at providing a solution which is compatible with conventional uses of correspondence tables.

An embodiment of the present invention provides a method for allowing access to a table of address correspondence between a multitask CPU and at least one memory containing several programs, consisting of calculating, on each task change of the CPU, a signature of at least part of the program instruction lines and of checking the conformity of this signature to a signature recorded upon previous execution of the involved program.

According to an embodiment of the present invention, said signature is calculated by the implementation of a Hash function.

According to an embodiment of the present invention, said memory is a RAM in which are loaded program lines from a mass storage.

An embodiment of the present invention also provides a processor of multitask execution of several programs, exploiting a table of correspondence between virtual addresses of the lines of the different programs and physical addresses of these lines in at least one memory, each correspondence being associated with an identifier of the involved program, comprising means for calculating a current signature based on at least part of the program lines in said memory, and means for comparing this signature with the identifier of the program stored in the correspondence table.

According to an embodiment of the present invention, the identity of the signature and of the program identifier allows the CPU to execute the instruction of the involved program.

The foregoing features and advantages will be discussed in detail in the following non-limiting description of specific embodiments of the present invention in connection with the accompanying drawings.

DETAILED DESCRIPTION

Figure 1:
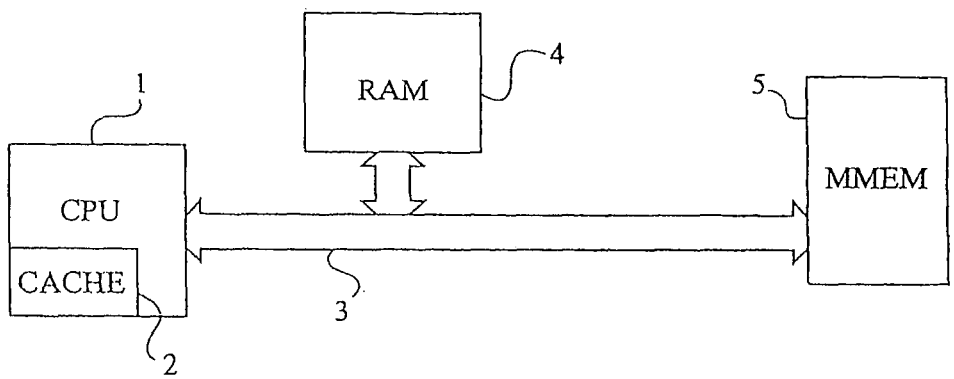
FIGS. 1 to 4, previously described, are intended to show the state of the art and the problem to solve.
Figure 3:
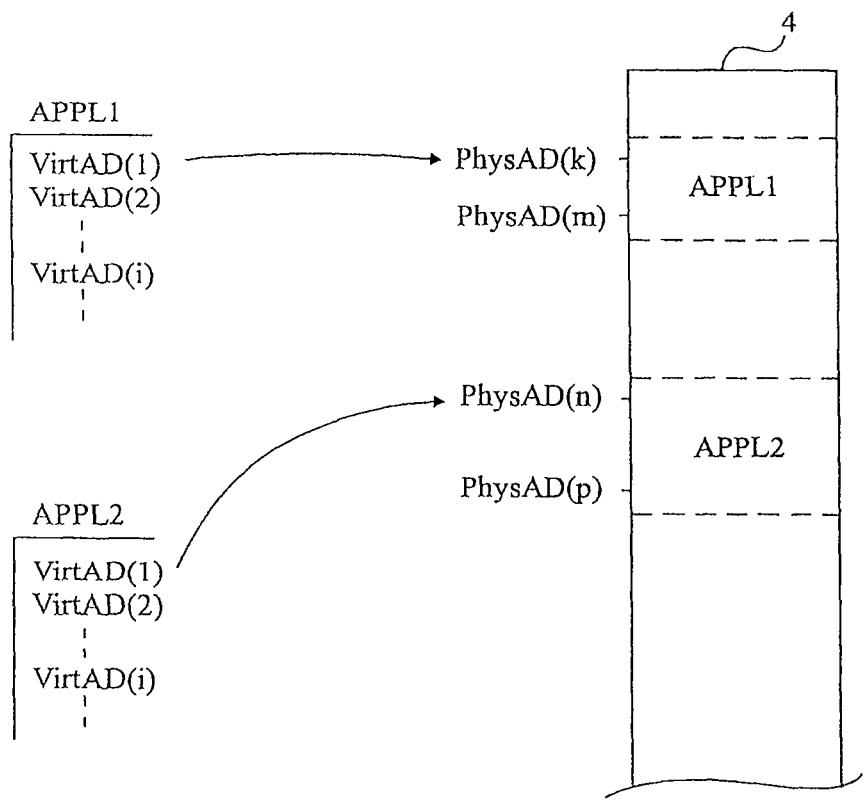
Figure 2:
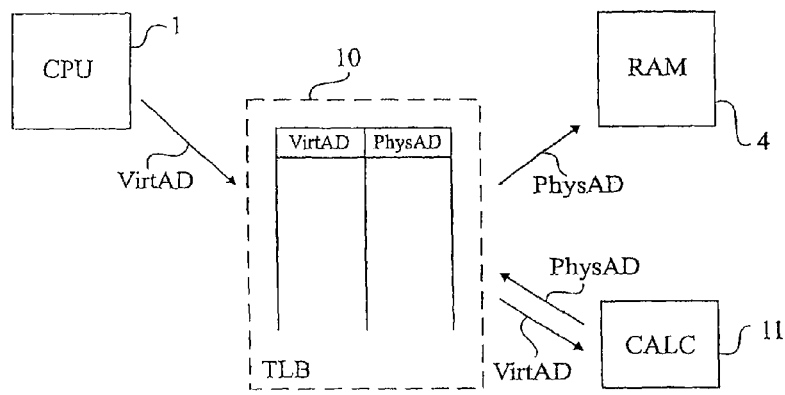

Same elements have been designated with same reference numerals in the different drawings. For clarity, only those steps of the method and those elements of the processor that are necessary to the understanding of embodiments of the present invention have been shown in the drawings and will be described hereafter. In particular, the calculation of actual correspondence tables has not been detailed, as such calculations can be implemented with conventionally-used calculation tools.

A feature of an embodiment of the present invention is to calculate, at each context change (coming of a new application to the foreground), the identifier of the application by means of an algorithm executing a Hash function or the like calculating a signature of at least part of the code of the application stored in the RAM and/or in the mass storage.

Another feature of an embodiment of the present invention is to check the conformity of this current calculated signature with respect to a previously-calculated reference signature stored in the correspondence table. The reference signature calculation is performed on each calculation of a new correspondence between a virtual address and a physical address. This signature however always remains the same for a same application.

Figure 5:
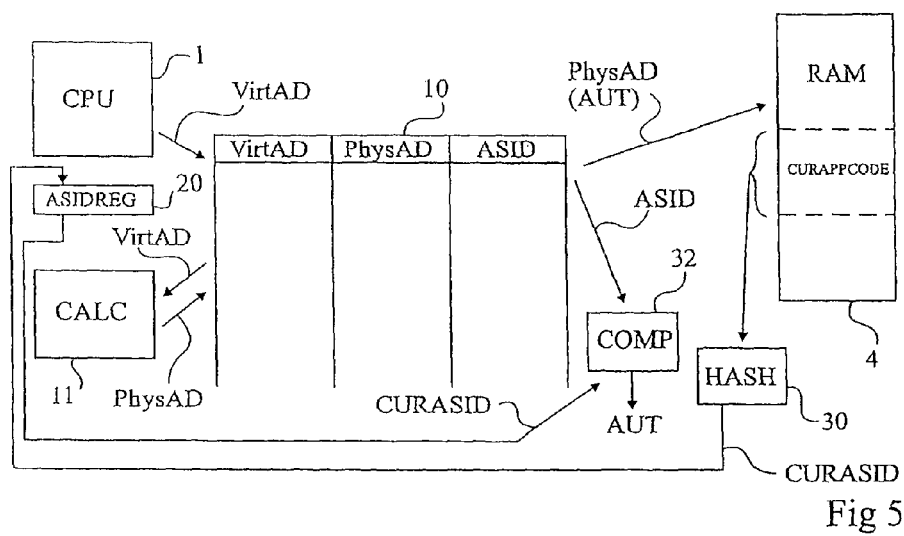
FIG. 5 very schematically shows in the form of blocks an embodiment of a microprocessor architecture implementing the correspondence table access authorization method according to an embodiment of the present invention.

FIG. 5 schematically illustrates, in the form of blocks, an embodiment of the present invention. The representation of FIG. 5 mainly shows the functional links between the different elements.

Figure 4:
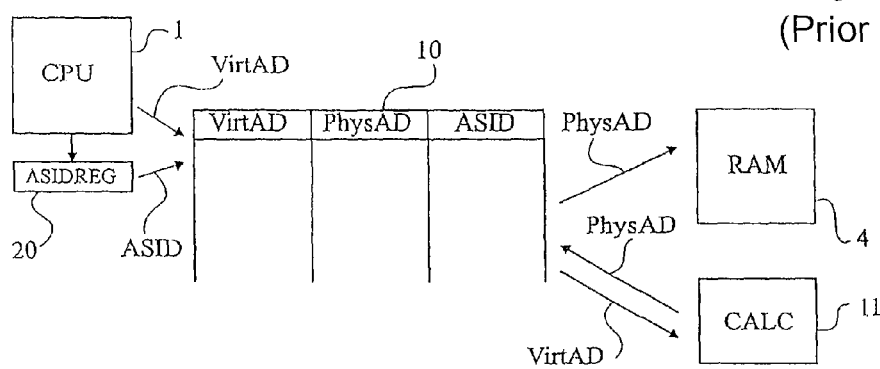

An embodiment of the present invention exploits an architecture of the type previously described in relation with FIG. 4, that is, exploiting an identifier ASID of the application or program associated with each correspondence line of table 10 between a virtual address VirtAD and a physical address PhysAD. As previously described, correspondence table 10 is used to convert virtual addresses of an application required by a CPU 1 provided with an application identifier register 20 (ASIDREG), into a physical address PhysAD of a RAM 4 in which is stored the concerned application. The CPU comprises hardware or software means (block 11, CALC) for having the physical addresses calculated by its exploitation system either at the loading of an application, or when a virtual address is called for the first time.

According to an embodiment of the present invention, each time an application (for example, a program or a sub-program) contained in memory 4 (or in a mass storage not shown) t comes to the foreground, that is, at least one of its instructions is executed by CPU 1, a signature (block 30, HASH) of at least part of the lines of the program stored in memory 4 is calculated. This signature provides a current application identifier (CURASID) stored in register 20. The content of register 20 is then compared (block 32, COMP) with the identifier ASID stored on the line of table 10 corresponding to the involved application which is desired to be used. The result of this comparison enables verifying that the operation code of the application has not been modified in the RAM while this application was in the background. Comparison block 32, be it hardware or software, provides an authorization or authentication signal AUT to CPU 1 to take the appropriate measures. In practice, the CPU will only execute, or will only transfer into its cache memory for execution, the instructions of the program stored in RAM 4 if comparator 32 has authenticated that the operation code has not been modified since its loading into memory 4.

Preferably, the signature calculation is performed on a fixed significant portion of the code of the program stored in the RAM. "Fixed portion" means that lines containing data processed by the program, and the content of which is thus likely to change and to modify their signature even when no piracy has occurred, should be avoided. "Significant" means that the larger the number of code lines taken into account in the signature calculation, the more the authentication will be robust in terms of efficiency. As an example, the signature can be calculated taking one line out of ten, one line out of twenty, or one line out of thirty of the operation code.

An advantage of an embodiment of the present invention is that a modification of the operation code of a background program stored in a RAM becomes difficult since its operation code must be modified while respecting the signature, the calculation algorithm of which is in principle unknown. Preferably, to guarantee the system security and for rapidity reasons, the Hash function is executed in hardware fashion in an integrated circuit.

The application being executed necessarily is in the cache memory of the microprocessor which forms an area considered as untouchable for a pirate. Only when the application is pending in the RAM does there exist a risk of piracy.

It should be noted that if the totality of a program is not transferred from the mass storage (5, FIG. 1) to the RAM at the application loading, the signature calculation can exploit program lines still present in the mass storage.

An advantage of an embodiment of the present invention is that, without requiring recalculation of correspondence table 10 on each coming to the foreground of a new application, it prevents an operation code from being pirated when it is in the background in a multitask processing. Of course, the content of the lines of table 10 can be overwritten as it is filled, as conventionally used to be the case in the solution discussed in relation to FIG. 4.

Any conventional algorithm executing a function of Hash type may be used. Among known algorithms, one can mention, for example, the algorithm known as SHA-1 which operates on 512-bit blocks and provides a 160-bit signature as an output. For the application of such an algorithm, the code or code portion of which a signature is desired to be obtained is cut into blocks of 512 bits for which are calculated, each time, five concatenated 32-bit words corresponding to the block signature. In this case, a single word out of the five 32-bit words of the signature may be used and the first words of several signatures calculated on different blocks may be added to obtain the current code CURASID of the application.

The architecture illustrated in and described with reference to FIG. 4 may be part of an electronic system, such as a computer system.

Of course, embodiments of the present invention are likely to have various alterations, modifications, and improvements which will readily occur to those skilled in the art. In particular, the selection of the signature calculation algorithm preferentially depends on the size of the application identifiers used in the correspondence table and on the security level desired for the system. Further, the selection of the operation code lines to be taken into account in the signature calculation is within the abilities of those skilled in the art based on the functional indications given hereabove. Finally, although a hardware implementation of the signature calculation is preferred, embodiments of the present invention do not exclude a software implementation.

Such alterations, modifications, and improvements are intended to be part of this disclosure, and are intended to be within the spirit and the scope of embodiments of the present invention. Accordingly, the foregoing description is by way of example only and is not intended to be limiting.

What is claimed is:

1. A method, comprising:
   executing, by a multitasking processor in a foreground, a first program module, the executing including accessing a table of address correspondence between the multitasking processor and a memory storing instruction lines of multiple program modules;
   transitioning from foreground execution of the first program module by the multitasking processor to foreground execution by the multitasking processor of another program module of the multiple program modules;
   calculating a first signature based on at least some instruction lines of the first program module stored in the memory; and
   transitioning to foreground execution of the first program module, the transitioning including:
   calculating a second signature based on the at least some instruction lines of the first program module stored in the memory;
   comparing the first signature to the second signature; and
   preventing execution of instruction lines of the first program module stored in the memory by the multitasking processor based on the comparing.

2. The method of claim 1 wherein the preventing execution comprises preventing instruction lines of the first program module stored in the memory from being loaded into an internal cache of the multitasking processor.

3. The method of claim 1 wherein the calculating the first signature is based on a hash function.

4. The method of claim 1 wherein the memory is a random access memory and the method comprises loading instruction lines into the memory from a mass storage device.

5. The method of claim 4 wherein the calculating the first signature is based on at least some additional instruction lines of the first program module stored in the mass storage device.

6. The method of claim 1 wherein the calculating the first signature occurs during foreground executing of the first program module by the multitasking processor.

7. The method of claim 1 wherein the calculating the first signature occurs during the transitioning from foreground execution of the first program module to foreground execution by the multitasking processor of the another program module.

8. The method of 1 wherein the calculating the first signature occurs during an initial foreground execution of the first program module by the multitasking processor.

9. The method of claim 1 wherein the first program module is a task of a first program and the another program module is a task of a second program.

10. A system, comprising:
    signature calculation circuitry, which, in operation, calculates signatures based on instruction lines stored in a memory;
    a register which, in operation, stores a signature calculated by the signature calculation circuitry and associated with one or more instruction lines of a program module stored in the memory during a previous foreground execution of the program module by a multitasking processing device; and
    a comparator which, in operation,
    compares a current signature of instruction lines stored in the memory and generated by the signature calculation circuitry to the signature stored in the register; and
    generates, based on the comparing, an output signal to prevent execution of current instruction lines stored in the memory and associated with the program module by the multitasking processing device.

11. The system of claim 10, comprising the memory and the multitasking processing device.

12. The system of claim 11 wherein the signature calculation circuitry, the register and the comparator are separate from the multitasking processing device.

13. The system of claim 10 wherein, in operation, the output signal prevents instruction lines of the program module stored in the memory from being loaded into an internal cache of the multitasking processing device during a transition from background execution of the program module to foreground execution of the program module.

14. The system of claim 10 wherein the signature calculation circuitry, in operation, calculates signatures based on a hash function.

15. The system of claim 10 wherein the memory is a random access memory, which, in operation, stores instruction lines loaded from a mass storage device.

16. The system of claim 10 wherein the signature stored in the register is a signature generated during the previous foreground execution of the program module by the multitasking processing device.

17. The system of claim 10 wherein the signature stored in the register is a signature generated during a transition from foreground execution of the program module by the multitasking processing device to foreground execution by the multitasking processing device of another program module.

18. A device, comprising:
one or more memories; and
circuitry, which, in operation, manages execution of multiple program modules by:
transitioning from foreground execution of a first program module to foreground execution of a second program module of the plurality of program modules;
calculating a first signature based on at least some instruction lines of the first program module stored in a random access memory during foreground execution of the first program module; and
transitioning to foreground execution of the first program module, the transitioning including:
calculating a second signature based on at least some current instruction lines associated with the first program module and stored in the random access memory;
comparing the first signature to the second signature; and
preventing execution of the current instruction lines associated with the first program module stored in the random access memory by the multitasking processor based on the comparing.

19. The device of claim 18, comprising a multitasking processor, wherein the preventing execution comprises preventing current instruction lines associated with the first program module stored in the random access memory from being loaded into an internal cache of the multitasking processor.

20. The device of claim 18 wherein, in operation, the circuitry calculates the first signature during the transitioning from foreground execution of the first program module to foreground execution of the second program module.

21. The device of claim 18 wherein:
the one or more memories comprises a register, which, in operation, stores the first signature; and
the circuitry comprises:
a hash block, which, in operation, calculates the first and second signatures; and
a comparator, which, in operation, compares the first and second signatures.

22. The device of claim 21 wherein the managing execution of the multiple program modules comprises maintaining a table of address correspondence between a multitasking processor and the random access memory.

* * * * *